United States Patent
Susella et al.

(10) Patent No.: US 10,333,718 B2
(45) Date of Patent: Jun. 25, 2019

(54) METHOD FOR THE GENERATION OF A DIGITAL SIGNATURE OF A MESSAGE, CORRESPONDING GENERATION UNIT, ELECTRONIC APPARATUS AND COMPUTER PROGRAM PRODUCT

(71) Applicant: STMicroelectronics S.r.l., Agrate Brianza (IT)

(72) Inventors: Ruggero Susella, Milan (IT); Sofia Montrasio, Vedano al Lambro (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 164 days.

(21) Appl. No.: 15/441,001

(22) Filed: Feb. 23, 2017

(65) Prior Publication Data
US 2018/0026798 A1 Jan. 25, 2018

(30) Foreign Application Priority Data
Jul. 20, 2016 (IT) .......................... 102016000076089

(51) Int. Cl.
*H04L 29/06* (2006.01)
*H04L 9/32* (2006.01)
*H04L 9/30* (2006.01)

(52) U.S. Cl.
CPC .......... *H04L 9/3252* (2013.01); *H04L 9/3066* (2013.01)

(58) Field of Classification Search
CPC ... H04L 9/3252; H04L 9/3066; H04L 9/0852; H04L 9/0838; H04L 9/0841; H04L 63/0428
(Continued)

(56) References Cited

U.S. PATENT DOCUMENTS 6,341,349 B1 * 1/2002 Takaragi ............... H04L 9/3013
380/28
7,308,096 B2 * 12/2007 Okeya ..................... G06F 7/725
380/28
(Continued)

FOREIGN PATENT DOCUMENTS

CN 104836670 A 8/2015
CN 104852805 A 8/2015

OTHER PUBLICATIONS

ElGamal, T, "*A public key cryptosystem and a signature scheme based on discrete logarithms,*" In Advances in cryptology (pp. 10-18), Springer Berlin Heidelberg, Aug. 1984, 9 pages.
(Continued)

*Primary Examiner* — Hosuk Song
(74) *Attorney, Agent, or Firm* — Seed IP Law Group LLP

(57) ABSTRACT

A device includes digital signature generation circuitry. The digital signature generation circuitry, in operation, generates a digital signature of a digital message by computing a first public curve point as a scalar product of a first secret integer key and a base point of an elliptic curve and applying a transform to data of the received digital message. The applying the transform to the data of the received digital message includes generating a second secret curve point as a scalar product of a second secret integer key and the base point of the elliptic curve, generating a modified secret integer nonce as a modular multiplication of the second secret integer and a secret integer nonce, generating a third curve point as a scalar product of the secret integer nonce and the second secret curve point and generating a signature component as a function of at least the modified secret nonce, the third curve point, and a hash value generated by applying a hash function to at least the data of the received
(Continued)

digital message. The digital signature is generated based on the signature component.

21 Claims, 3 Drawing Sheets

(58) Field of Classification Search
USPC .................................. 713/180; 380/255, 277
See application file for complete search history.

(56) References Cited

U.S. PATENT DOCUMENTS

| | | | | |
|---|---|---|---|---|
| 7,379,546 B2* | 5/2008 | Ibrahim | .................. | G06F 7/725 380/259 |
| 7,853,012 B2* | 12/2010 | Sarangarajan | .......... | H04L 9/003 380/28 |
| 8,046,582 B2* | 10/2011 | Akiyama | .............. | H04L 9/3093 380/277 |
| 8,699,701 B2* | 4/2014 | Ghouti | .................. | H04L 9/3013 380/259 |
| 8,891,756 B2* | 11/2014 | Brown | .................. | H04L 9/0643 380/28 |
| 9,800,418 B2* | 10/2017 | Antipa | .................. | H04L 9/3252 |

OTHER PUBLICATIONS

Cao et al., "Two Lattice-Based Differential Fault Attacks Against ECDSA with wNAP Algorithm," *ICISC 2015: Information Security and Cryptology*, pp. 297-313, 2016.

Italian Search Report and Written Opinion, dated Apr. 25, 2017, for Italian Application No. 201600076089, 8 pages.

* cited by examiner

METHOD FOR THE GENERATION OF A DIGITAL SIGNATURE OF A MESSAGE, CORRESPONDING GENERATION UNIT, ELECTRONIC APPARATUS AND COMPUTER PROGRAM PRODUCT

BACKGROUND

Technical Field

The present description relates to techniques for the generation of a digital signature of data of a message.

Various embodiments may apply, e.g., to smartcard, microcontrollers, set-top-box using a digital signature scheme.

Description of the Related Art

Cryptographic protocols, or encryption protocols, are abstract or concrete protocols that perform a security-related function and apply cryptographic methods, often as sequences of cryptographic primitives. A cryptographic primitive which is fundamental in authentication, authorization, and non-repudiation is the digital signature. The purpose of a digital signature, exactly as the one of a traditional signature, is to provide a means for an entity to bind its identity to a piece of information. The process of digital signing entails transforming the message and some secret information held by the entity into a tag called a signature.

In general, defining M as the set of messages which can be signed, S a set of elements called signatures, binary strings of a fixed length, $S_A$ indicate a transformation from the message set M to the signature set S and is called a signing transformation for entity A, e.g., for instance the sender of the message M. $V_A$ is a transformation from the set M×S to the set {true, false} and is called a verification transformation for the signatures of the entity A. It is publicly known, and can be used by everyone to verify signatures created by the entity or sender A.

In the present description the definition of message M encompasses not only e-mail message, but extends to any type of digital data of messages which can be sent from a sender to a receiver and are suitable to generate a valid signature applying the methods described here.

A digital signature scheme, identified by a couple $S_A$, $V_A$ typically consists of three procedures:
- a key generation procedure that selects a private key a from a set of possible private keys. The procedure outputs the private key a and a corresponding public key A;
- a signature procedure that, given a message M and a private key a, produces a signature $S=S_A(M)$;
- a signature verification procedure that, given the message M, public key A and signature $S_A(M)$, either accepts or rejects the message's claim to authenticity computing a verification signature $V_A(M, S_A(M))$.

Scalar multiplication is the fundamental operation for the cryptographic primitives based on the elliptic curve discrete logarithm problem. The processes here described refer in particular to the family of elliptic curve digital signature schemes. Until 1992 the schemes were proposed on multiplicative groups, but then the cryptographic community turned to elliptic curves, also indicated as ECC (Elliptic Curves Cryptography).

In general, the procedures of digital signature based on elliptic curves are based on a given elliptic curve E and a given elliptic curve base point B of a given order l, which is a large prime. E, B and l are known to a sender of the message M and to a receiver of the message M.

The first scheme of this nature was presented in 1985 by the Egyptian researcher Taher ElGamal, at Stanford University in ElGamal, T. "*A public key cryptosystem and a signature scheme based on discrete logarithms*". In Advances in cryptology (pp. 10-18). Springer Berlin Heidelberg. August 1984.

Schemes like ECDSA (Elliptic Curve Digital Signature Algorith); Schnorr and EdDSA (Edwards-curve Digital Signature Algorithm) derive from the El Gamal scheme.

In FIG. 1 it is described a method for computing a digital signature 100 based on the Schnorr algorithm.

As mentioned, given a determined elliptic curve E, with a base point B of an order l, such that l×B=0, where × denotes elliptic curve scalar multiplication, the curve E, the point B and the order l being known both to the sender or user and to the receiver, e.g., being public, in a key-generation procedure 110 the sender chooses a secret integer a in an interval of integers {1, 2, . . . , l−1}, said interval having length l−1, as secret key, and computes a public key curve point, A=a×B, which is used as public key.

Then, a signature procedure 120 computes a transformation $S_A$ to be applied to the message M, for example as follows:
- at 121 a cryptographic "nonce" r, e.g., an arbitrary number that may only be used once, is randomly generated. The nonce r can be alternatively generated in a deterministic manner;
- at 122 a point $R=(x_R, y_R)=r\times B$, e.g., as the scalar product of nonce r and base point B, where $x_R$ and $y_R$ are the coordinates of the point R, is calculated;
- at 123 it is computed a signature component s=r+H(M, R)a mod l, where H is a hash function, M is the message to be signed, a is the private key, l is the order of the base point B. A hash value H(M,R) is calculated by applying the hash function H to said message M concatenated with the point R;
- at 124 is supplied as output a signature S=(s, H (M, R)), as the pair of the signature component s and of the hash value H(M,R).

With the reference number 130 in FIG. 1 is also indicated for completeness a verification 130, which is not part of the method of computing a digital signature 100, which is performed by the sender, but it is rather part of a corresponding method for verifying the digital signature, implementing the calculation of the verification signature $V_A(M, S_A(M))$.

Basically, the Schnorr signature verification includes at first checking if the integer corresponding to the signature component s is in the interval {1, 2, . . . , l−1} and if the point A, e.g., the public key, is in $E(F_p)$, where $F_p$ is the finite field over which the curve E is defined. Then the double base scalar multiplication V=s×B−H(M,R)×A is computed and whether H(M,V)==H(M,R) is checked.

In general the component signature s in the different digital signature schemes employing elliptic curves may be defined as follows:
Elgamal: $s=r^{-1}(H(M)-at)$ mod l
ECDSA: $s=r^{-1}(H(M)+at)$ mod l
Schnorr: s=r+H(M, R)a mod l
EdDSA: s=r+H(R, A, M)a mod l In the ECDSA or El Gamal procedure computing the signature component includes computing a function which includes the field multiplication of the inverse of the nonce r, and of a hash value calculated by applying the hash function H to the message (M). The variable t is a variable storing the $x_R$ coordinated mod 1 of the point R. The signature S is the pair of the component signature s and of the variable t in the ECDSA, while the signature S in the Elgamal procedure is the pair of the component signature s and of the point R.

In the Schnorr or EdDSA procedure computing the signature component includes computing a function which includes the sum of the nonce r and of a hash value H(M,R) calculated by applying a hash function H to said message M and to said point R. The EdDSA applies the hash function also to the public key A. As shown with reference to FIG. 1, the signature S is the pair of the component signature s and of the hash value H(M,R).

These algorithms are subject to risks of attacks if they use the same r value twice. This allows to retrieve the private key a, for instance in the case of Schnorr's scheme the private key can be recovered just with a subtraction and an inversion.

There is also a danger in knowing a few bits of an ephemeral key such as the nonce since in this case a Hidden Number Problem (HNP) attack can be performed. The hidden number problem has a solution which can be found in polynomial time. As indicated for instance in Phong Nguyen and Igor Shparlinski such an attack on ECDSA requires only 3 least significant bits of the nonces for 100 signatures or 4 most significant bits. If the window of consecutive known bits is not at one end, one requires twice as many bits.

Therefore, if an attacker gets to know a few bits (4 or 5) of the nonce for many signatures, he can mount an HNP based attack to recover the private key. The typical size for the nonce r is 256 bits.

BRIEF SUMMARY

An embodiment may facilitate providing a method for computing a digital signature of a message based on elliptic curves that helps address the drawbacks of the prior art and in particular is resistant to HNP attacks, in particular with a low computation cost.

In an embodiment, a method, comprises computing a first public curve point as a scalar product of a first secret integer key and a base point of an elliptic curve; applying a transform to data of a message, the applying of the transform to the data of the message including: generating a second secret curve point as a scalar product of a second secret integer key and the base point of the elliptic curve; generating a modified secret integer nonce as a modular multiplication of the second secret integer and a secret integer nonce; generating a third curve point as a scalar product of the secret integer nonce and the second secret curve point; and generating a signature component as a function of at least the modified secret nonce, the third curve point, and a hash value generated by applying a hash function to at least the data of the message; and generating a digital signature based on the signature component. In an embodiment, the generating the signature component includes performing a modular multiplication of an inverse of the modified secret nonce and of a hash value calculated by applying the hash function to the data of the message. In an embodiment, the signature component is generated according to one of an Elliptic Curve Digital Signature Algorithm (ECDSA) and an El Gamal algorithm, modified to use the modified secret integer nonce in place of the integer nonce, and to use the second secret curve point in place of the base curve point to generate the third curve point. In an embodiment, the generating the signature component includes adding the modified secret nonce and a hash value calculated by applying the hash function to the data of the message and to the third curve point. In an embodiment, the signature component is generated according to one of a Schnorr Algorithm and an Edwards-Curve Digital Signature Algorithm (EdDSA), modified to use the modified secret integer nonce in place of the integer nonce, and to use the second secret curve point in place of the base curve point to generate the third curve point. In an embodiment, the method comprises verifying the signature based on the first public curve point and the base point of the elliptic curve.

In an embodiment, a device comprises: one or more input nodes, which, in operation, receive one or more digital messages; and digital signature generation circuitry, which, in operation, generates a digital signature of a received digital message by: computing a first public curve point as a scalar product of a first secret integer key and a base point of an elliptic curve; applying a transform to data of the received digital message, the applying the transform to the data of the received digital message including: generating a second secret curve point as a scalar product of a second secret integer key and the base point of the elliptic curve; generating a modified secret integer nonce as a modular multiplication of the second secret integer and a secret integer nonce; generating a third curve point as a scalar product of the secret integer nonce and the second secret curve point; and generating a signature component as a function of at least the modified secret nonce, the third curve point, and a hash value generated by applying a hash function to at least the data of the received digital message; and generating the digital signature based on the signature component. In an embodiment, the digital signature generation circuitry, in operation, generates the signature component by performing a modular multiplication of an inverse of the modified secret nonce and of a hash value calculated by applying the hash function to the data of the message. In an embodiment, the digital signature generation circuitry, in operation, generates the signature component according to one of an Elliptic Curve Digital Signature Algorithm (ECDSA) and an El Gamal algorithm, modified to use the modified secret integer nonce in place of the integer nonce, and to use the second secret curve point in place of the base curve point to generate the third curve point. In an embodiment, the digital signature generation circuitry, in operation, generates the signature component by adding the modified secret nonce and a hash value calculated by applying the hash function to the data of the message and to the third curve point. In an embodiment, the digital signature generation circuitry, in operation, generates the signature component according to one of a Schnorr Algorithm and an Edwards-Curve Digital Signature Algorithm (EdDSA), modified to use the modified secret integer nonce in place of the integer nonce, and to use the second secret curve point in place of the base curve point to generate the third curve point. In an embodiment, the device comprises a random number generator, which, in operation, generates the nonce.

In an embodiment, a system comprises: message generating circuitry, which, in operation, generates digital messages; and digital signature generation circuitry, which, in operation, generates digital signatures of digital messages by: computing a first public curve point as a scalar product of a first secret integer key and a base point of an elliptic curve; applying a transform to data of a digital message, the applying the transform to the data of the digital message including: generating a second secret curve point as a scalar product of a second secret integer key and the base point of the elliptic curve; generating a modified secret integer nonce as a modular multiplication of the second secret integer and a secret integer nonce; generating a third curve point as a scalar product of the secret integer nonce and the second secret curve point; and generating a signature component as a function of at least the modified secret nonce, the third curve point, and a hash value generated by applying a hash function to at least the data of the digital message; and generating a digital signature based on the signature component. In an embodiment, the digital signature generation circuitry, in operation, generates the signature component by performing a modular multiplication of an inverse of the modified secret nonce and of a hash value calculated by applying the hash function to the data of the digital message. In an embodiment, the digital signature generation circuitry, in operation, generates the signature component by adding the modified secret nonce and a hash value calculated by applying the hash function to the data of the message and to the third curve point. In an embodiment, the system comprises a random number generator, which, in operation, generates the nonce. In an embodiment, the message generating circuitry comprises a digital image sensor. In an embodiment, the system comprises a set-top-box.

In an embodiment, a non-transitory computer-readable medium has contents which configure digital signal processing circuitry to perform a method, the method comprising: computing a first public curve point as a scalar product of a first secret integer key and a base point of an elliptic curve; applying a transform to data of a message, the applying the transform to the data of the message including: generating a second secret curve point as a scalar product of a second secret integer key and the base point of the elliptic curve; generating a modified secret integer nonce as a modular multiplication of the second secret integer and a secret integer nonce; generating a third curve point as a scalar product of the secret integer nonce and the second secret curve point; and generating a signature component as a function of at least the modified secret nonce, the third curve point, and a hash value generated by applying a hash function to at least the data of the message; and generating a digital signature based on the signature component. In an embodiment, the generating the signature component includes performing a modular multiplication of an inverse of the modified secret nonce and of a hash value calculated by applying the hash function to the data of the message. In an embodiment, the generating the signature component includes adding the modified secret nonce and a hash value calculated by applying the hash function to the data of the message and to the third curve point.

In an embodiment, a method comprises generating a digital signature of data of a message implemented on a elliptic curve, said method operating on the basis of a given elliptic curve and a given base point of a given order which are known to a sender of the message and to a receiver of the message, said method including a key-generation procedure in which a secret integer key is chosen and it is computed a public key as a scalar product of the secret key and of the elliptic curve point of a given elliptic curve, a signature procedure comprising applying a transformation to said data of a message to obtain a signature, said transformation including choosing an integer secret nonce and computing a point as a function of said integer secret nonce and of said elliptic curve base point, and calculating a signature component as a function of at least said integer secret nonce, of said point and of a hash value calculated by applying a hash function at least to said message, outputting a signature comprising said signature component, wherein said key-generation procedure includes choosing a second secret key and computing a second key curve point as a scalar product of said second secret key and said elliptic curve base point, said signature procedure includes computing a modified nonce as modular multiplication of said secret nonce and of said second secret key in addition to said choosing an integer secret nonce and computing said point as scalar product of said secret nonce and of said second key curve point, calculating said signature component as a function of at least said integer secret nonce, of said point and of a hash value calculated by applying a hash function at least to said message, using said modified nonce in place of the secret nonce and said point computed as scalar product of said secret nonce and of said second key curve point. In an embodiment, said computing the signature component includes computing a function which includes the multiplication of the inverse of the modified nonce and of a hash value calculated by applying a hash function to said message, in particular according to a ECDSA or El Gamal procedure. In an embodiment, said computing the signature component includes computing a function which includes the sum of the modified nonce of a hash value calculated by applying a hash function to said message and to said point, in particular according to a Schnorr or EdDSA procedure. In an embodiment, a digital signature generation circuit is configured to perform one or more methods described herein. In an embodiment, a system includes a digital signature computation circuit configured to perform one or more of the methods described herein. In an embodiment, a computer program product that can be loaded into the memory of at least one computer comprises parts of software code that are able to execute one or more of the methods described herein.

As used herein, reference to such a computer program product is understood as being equivalent to reference to a computer-readable medium containing instructions for controlling the processing system in order to co-ordinate implementation of the method according to the embodiments. Reference to "at least one computer" is evidently intended to highlight the possibility of the present embodiments being implemented in modular and/or distributed form.

According to an embodiment, the method includes a key-generation procedure which includes choosing a second secret key and computing a second key curve point as a scalar product of said second secret key and said elliptic curve base point, while the signature procedure includes computing a modified nonce as modular multiplication of said secret nonce and of said second secret key and computing said point as scalar product of said secret nonce and of said second key curve point, calculating the signature component using said modified nonce in place of the secret nonce and said point computed as scalar product of said secret nonce and of said second key curve point.

In various embodiments, computing the signature component includes computing a function which includes the modular multiplication of the inverse of the modified nonce and of a hash value calculated by applying a hash function to said message, in particular according to a ECDSA or El Gamal procedure.

In various embodiments, computing the signature component includes computing a function which includes the sum of the modified nonce of a hash value calculated by applying a hash function to said message and to said point, in particular according to a Schnorr or EdDSA procedure.

BRIEF DESCRIPTION OF THE SEVERAL VIEWS OF THE DRAWINGS

The disclosure will now be described purely by way of a non-limiting example with reference to the annexed drawings, in which.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

The nonce r ideally should be uniformly randomly generated. There should ideally be no issues in the random number generators. Some practical attacks have exploited bad generators. It is possible to generate the nonce r deterministically coupled with a secret. This remains however vulnerable to side channel attacks. The nonce r could be attacked by side channel attacks in the scalar multiplication r×B. This is not easy as the nonce r changes each time, but only some bits are required. If few bits of many r are recovered, the HNP attack can be performed.

An embodiment facilitates thwarting HNP attacks which require just a few bits of r, by using a modified key generation procedure by adding a second secret key c and a second key curve point C=c×B, where both c and C should be kept secret also to the receiver. Also it is employed a modified signature generation.

Figure 1:
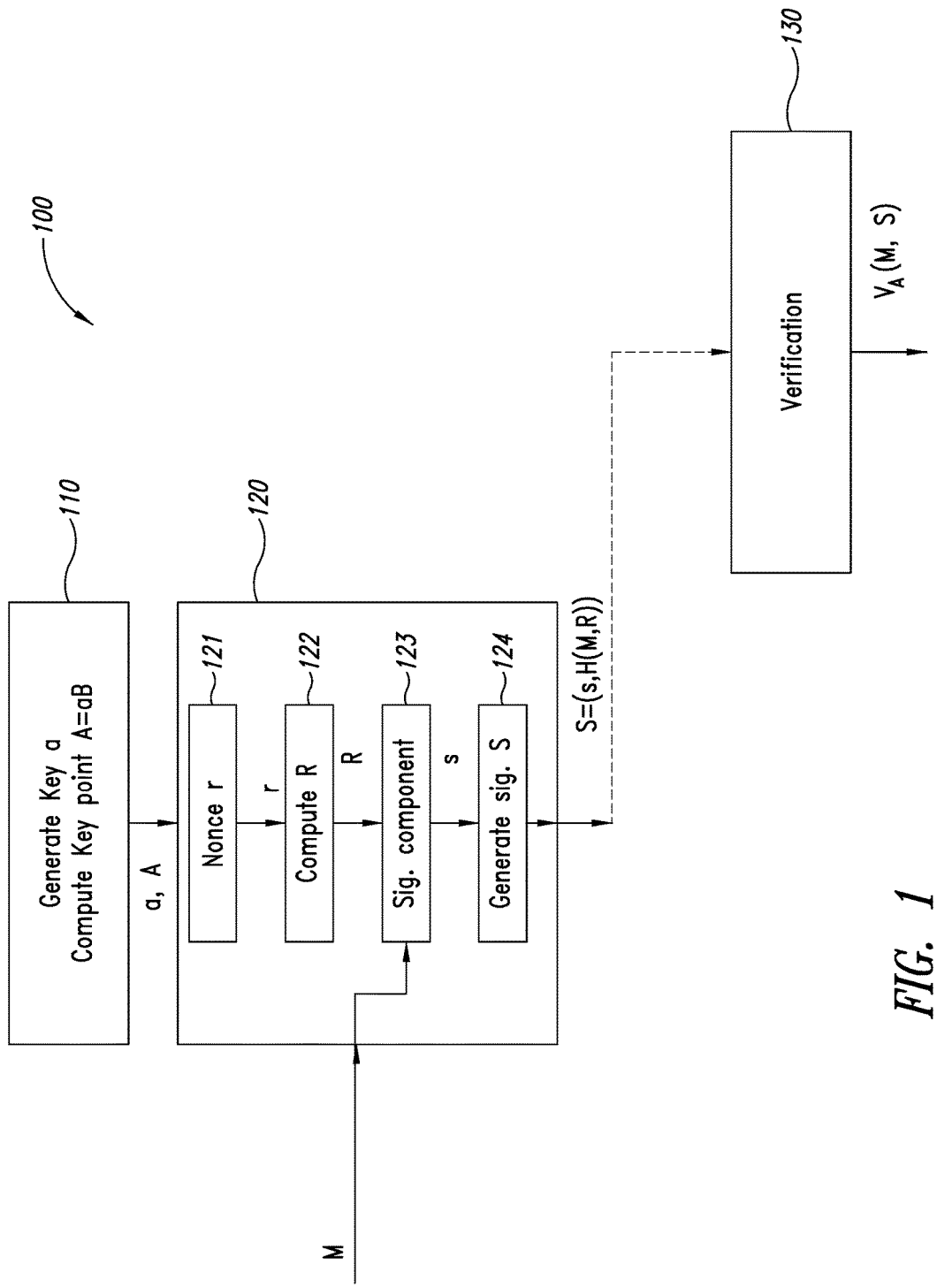
FIG. 1 was discussed in the foregoing.
Figure 2:
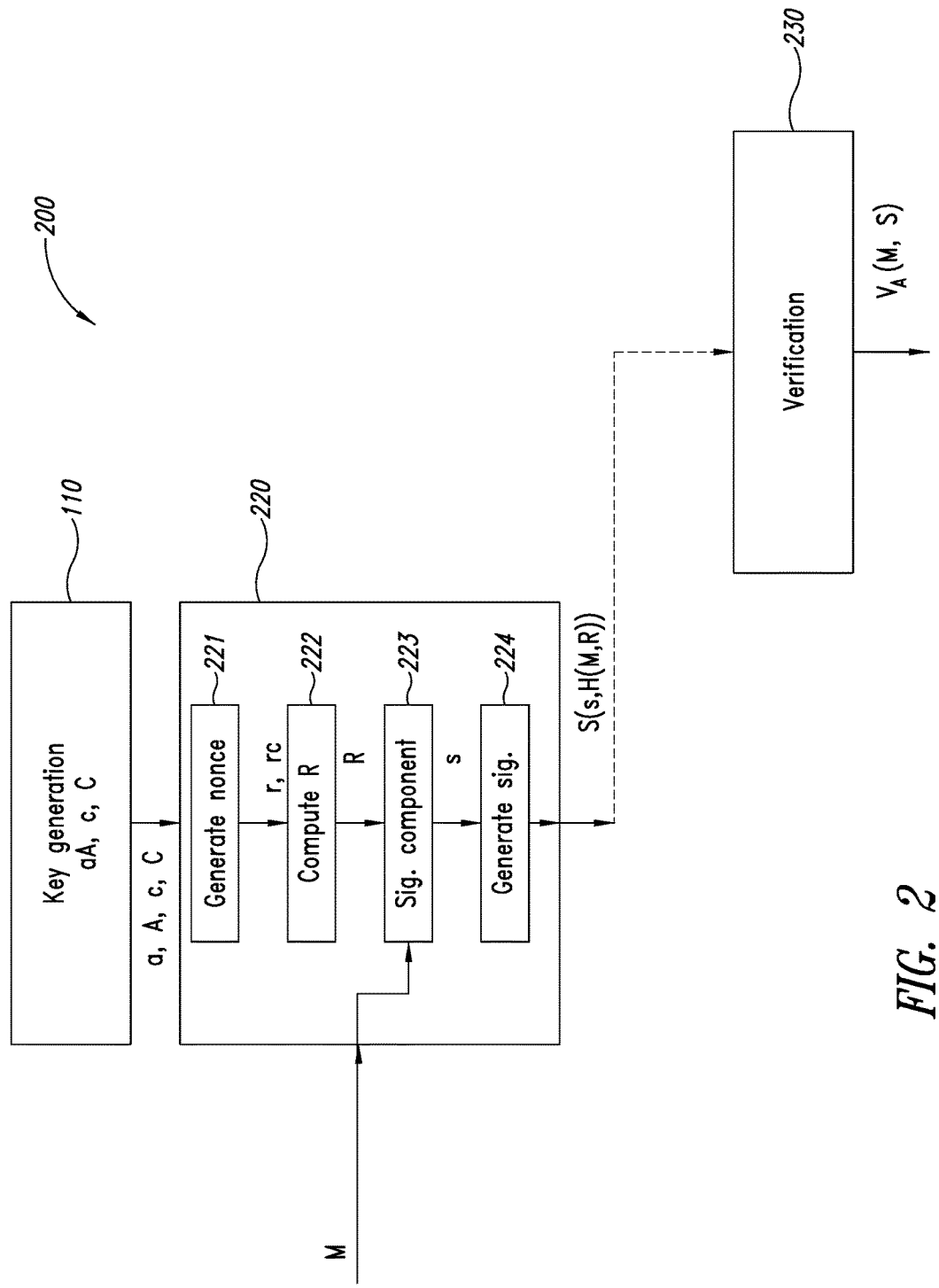
FIG. 2 represents a flow diagram which shows an embodiment of the solution here described.

More in detail, with reference to FIG. 2, where an embodiment 200 of a method for computing the digital signature of a message (M) is shown by way of a flow diagram, in a key generation procedure 210, given a determine elliptic curve E, with a base point B of an order l, such that l is the smallest integer for which l×B=0, where × denotes elliptic curve scalar multiplication and 0 denotes the neutral element of the group of points of the elliptic curve, the curve E, the point B and the order l being known both to the sender or user and to the receiver, e.g., being public, the sender chooses a secret random integer a in an interval of integers {1, 2, ..., l−1}, such interval having length l−1, as secret key, and computes a public key curve point, A=a×B, which is used as public key. In the same key generation procedure 210 a second secret key c is chosen in the interval of integers {1, 2, ..., l−1} and a second curve point C is chosen as C=c×B, e.g., as a scalar product of said second secret key c and said elliptic curve base point B. Both c and C are kept secret.

Then a modified signature procedure 220 is performed in which, for example:

at 221 a nonce r is randomly generated and a modified nonce rc as modular multiplication modulo l of said secret nonce r and of said second secret key c;

at 222 a point R=($x_R$, $y_R$)=r×C, is calculated, i.e., such point R is calculated as scalar product of said secret nonce r and of said second key curve point C, at 223 it is computed a signature component s=rc+H(M, R)a mod l, where H is a hash function, M is the message to be signed, a is the private key, l is the order of the base point B of the elliptic curve. In other words, it is provided calculating the signature component s using the modified nonce rc in place of the secret nonce r and the point (R) is computed as scalar product of the secret nonce r and of the second key curve point C;

at 224 is supplied as output a signature S=(s, H(M, R)), comprising said signature component s as computed at 223.

The verification procedure 130 remains unchanged.

Thus, in general, with reference to the embodiment of FIG. 2, the method for the generation of a digital signature of data of a message M implemented on a elliptic curve E here described includes computing 221 a modified nonce rc as modular multiplication of said secret nonce r and of said second secret key c in addition to said choosing an integer secret nonce r, which was performed alone in 121, and computing 222 said point R as scalar product of said secret nonce r and of said second key curve point C, in particular instead of using the base curve point B, calculating 223 said signature component s as a function of at least the integer secret nonce r, of the point R and of a hash value H(M,R) calculated by applying the hash function H at least to said message (M), and in the embodiment shown also to the point R, using the modified nonce rc in place of the secret nonce r and using the point (R) which is computed as scalar product of said secret nonce and of the second key curve point C.

Although the method 200 is described with reference to the Schnorr procedure, as mentioned can be extended to other digital signature schemes implemented on elliptic curves using the second secret key c and the second curve C as just indicated. In an embodiment, for the ECDSA or El Gamal procedure, computing the signature component s includes computing a function which includes the modular multiplication of the inverse of the modified nonce rc and of a hash value H(M) calculated by applying the hash function H to said message M alone, in particular according to a ECDSA or El Gamal procedure.

In an embodiment, the Schnorr or EdDSA procedure computing the signature component s includes instead computing a function which includes the sum of the modified nonce rc of a hash value H(M,R) calculated by applying the hash function H to said message M and at least to said point R.

Thus, on the basis of what have been just described, it can be seen how the thwarting of an HNP attack is facilitating by the second secret key c, which is unknown to the attacker.

Figure 3:
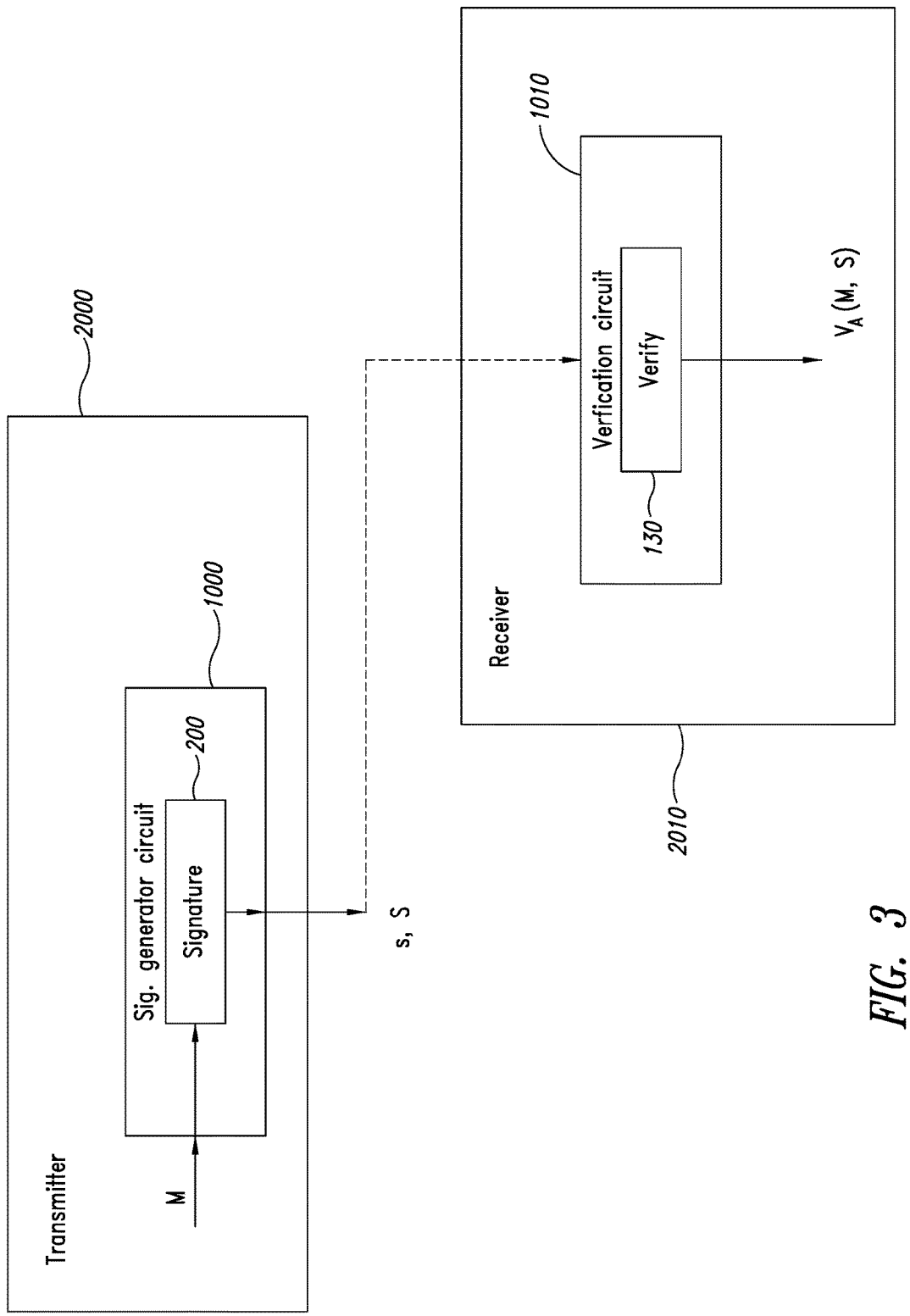
FIG. 3 shows an electronic apparatus using the method here described.

In FIG. 3 it is shown schematically a sender electronic apparatus 2000, as illustrated a transmitter, which comprises a circuit 1000, which, in operation, generates a digital signature of a message M, the generation being implemented on an elliptic curve E. The apparatus 2000 may comprise a digital message generating circuit, for instance apparatus 2000 may be a digital photo-camera comprising a digital image sensor, and a digital signature generation circuit 1000, which is able to apply a digital signature to the digital pictures, which in this case represents the messages M. The digital signature generation circuit 1000 may comprise, for example, a processing unit which can be a microprocessor, a memory, discrete circuitry (e.g., a random number generator), etc., and various combinations thereof. For example, a microprocessor configured to perform one or more of the methods here described, as illustrated the method 200 described with reference to FIG. 2. The microprocessor can be associated to memory means, internal or external with respect to the circuit 1000 or apparatus 2000, which store instructions for performing one or more of the methods here described. The digital signature generation circuit 1000 receives the message M, for instance from storage memory means of the apparatus 2000 such as a flash memory, and applies, for example, the method 200 producing a component signature s, and a signature S. In FIG. 3 it is also shown a corresponding receiver apparatus 2010, for instance an image printer or an image reproduction apparatus, which includes a verification circuit 1010 for performing the verification 130 on the signature S. If the verification is positive, for instance printing or reproduction of the image in the message is enabled.

As mentioned the electronic apparatus can be also a smart card, a cellular telephone, a set top box such as a digital satellite receiver or a digital terrestrial receiver, a games console, a computer (for example a personal computer), a peripheral (for example a printer), etc.

The electronic apparatus may also comprise any digital electronic device arranged to authenticate accessories like, for example, headphones, batteries, ink cartridges, or toner.

In an embodiment, prevention of successful HNP attacks is facilitated. If some bits of the nonce are recovered from the operation of scalar product of the nonce with the second curve point C, r×C, the HNP attack cannot be performed based on this information. Then side channel attacks against r×C are harder than against the product r×B because the point B is known while the second curve point C is secret.

In an embodiment, a method has an additional computational cost per signature of just one modular multiplication, as compared to conventional methods, which is less than 0.1% of the total cost.

Of course, without prejudice to the principle of the embodiments, the details of construction and the embodiments may vary widely with respect to what has been described and illustrated herein purely by way of example.

The method has been described with reference to a Schnorr procedure, but it can be applied also to other methods for the generation of a digital signature of a message based on elliptic curves, such as ECDSA or El Gamal procedure, and also EdDSA.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
computing, using digital signature generation circuitry, a first public curve point as a scalar product of a first secret integer key and a base point of an elliptic curve;
applying, using the digital signature generation circuitry, a transform to data of a message, the applying the transform to the data of the message including:
generating a second secret curve point as a scalar product of a second secret integer key and the base point of the elliptic curve;
generating a modified secret integer nonce as a modular multiplication of the second secret integer and a secret integer nonce;
generating a third curve point as a scalar product of the secret integer nonce and the second secret curve point; and
generating a signature component as a function of at least the modified secret nonce, the third curve point, and a hash value generated by applying a hash function to at least the data of the message; and
generating, using the digital signature generation circuitry, a digital signature based on the signature component.

2. The method according to claim 1 wherein the generating the signature component includes performing a modular multiplication of an inverse of the modified secret nonce and of a hash value calculated by applying the hash function to the data of the message.

3. The method of claim 1 wherein the signature component is generated according to one of an Elliptic Curve Digital Signature Algorithm (ECDSA) and an El Gamal algorithm, modified to use the modified secret integer nonce in place of the integer nonce, and to use the second secret curve point in place of the base curve point to generate the third curve point.

4. The method according to claim 1 wherein the generating the signature component includes adding the modified secret nonce and a hash value calculated by applying the hash function to the data of the message and to the third curve point.

5. The method of claim 1 wherein the signature component is generated according to one of a Schnorr Algorithm and an Edwards-Curve Digital Signature Algorithm (EdDSA), modified to use the modified secret integer nonce in place of the integer nonce, and to use the second secret curve point in place of the base curve point to generate the third curve point.

6. The method of claim 1, comprising verifying the signature based on the first public curve point and the base point of the elliptic curve.

7. A device, comprising:
one or more input nodes, which, in operation, receive one or more digital messages; and
digital signature generation circuitry, which, in operation, generates a digital signature of a received digital message by:
computing a first public curve point as a scalar product of a first secret integer key and a base point of an elliptic curve;
applying a transform to data of the received digital message, the applying the transform to the data of the received digital message including:
generating a second secret curve point as a scalar product of a second secret integer key and the base point of the elliptic curve;
generating a modified secret integer nonce as a modular multiplication of the second secret integer and a secret integer nonce;
generating a third curve point as a scalar product of the secret integer nonce and the second secret curve point; and
generating a signature component as a function of at least the modified secret nonce, the third curve point, and a hash value generated by applying a hash function to at least the data of the received digital message; and
generating the digital signature based on the signature component.

8. The device according to claim 7 wherein the digital signature generation circuitry, in operation, generates the signature component by performing a modular multiplication of an inverse of the modified secret nonce and of a hash value calculated by applying the hash function to the data of the message.

9. The device of claim 7 wherein the digital signature generation circuitry, in operation, generates the signature component according to one of an Elliptic Curve Digital Signature Algorithm (ECDSA) and an El Gamal algorithm, modified to use the modified secret integer nonce in place of the integer nonce, and to use the second secret curve point in place of the base curve point to generate the third curve point.

10. The device according to claim 7 wherein the digital signature generation circuitry, in operation, generates the signature component by adding the modified secret nonce and a hash value calculated by applying the hash function to the data of the message and to the third curve point.

11. The device of claim 7 wherein the digital signature generation circuitry, in operation, generates the signature component according to one of a Schnorr Algorithm and an Edwards-Curve Digital Signature Algorithm (EdDSA), modified to use the modified secret integer nonce in place of the integer nonce, and to use the second secret curve point in place of the base curve point to generate the third curve point.

12. The device of claim 7, comprising a random number generator, which, in operation, generates the nonce.

13. A system, comprising:
message generating circuitry, which, in operation, generates digital messages; and
digital signature generation circuitry, which, in operation, generates digital signatures of digital messages by:
computing a first public curve point as a scalar product of a first secret integer key and a base point of an elliptic curve;
applying a transform to data of a digital message, the applying the transform to the data of the digital message including:
generating a second secret curve point as a scalar product of a second secret integer key and the base point of the elliptic curve;
generating a modified secret integer nonce as a modular multiplication of the second secret integer and a secret integer nonce;
generating a third curve point as a scalar product of the secret integer nonce and the second secret curve point; and
generating a signature component as a function of at least the modified secret nonce, the third curve point, and a hash value generated by applying a hash function to at least the data of the digital message; and
generating the digital signature based on the signature component.

14. The system of claim 13 wherein the digital signature generation circuitry, in operation, generates the signature component by performing a modular multiplication of an inverse of the modified secret nonce and of a hash value calculated by applying the hash function to the data of the digital message.

15. The system of claim 13 wherein the digital signature generation circuitry, in operation, generates the signature component by adding the modified secret nonce and a hash value calculated by applying the hash function to the data of the message and to the third curve point.

16. The system of claim 13, comprising a random number generator, which, in operation, generates the nonce.

17. The system of claim 13 wherein the message generating circuitry comprises a digital image sensor.

18. The system of claim 13, comprising a set-top-box.

19. A non-transitory computer-readable medium having contents which configure digital signal processing circuitry to perform a method, the method comprising:
computing a first public curve point as a scalar product of a first secret integer key and a base point of an elliptic curve;
applying a transform to data of a message, the applying the transform to the data of the message including:
generating a second secret curve point as a scalar product of a second secret integer key and the base point of the elliptic curve;
generating a modified secret integer nonce as a modular multiplication of the second secret integer and a secret integer nonce;
generating a third curve point as a scalar product of the secret integer nonce and the second secret curve point; and
generating a signature component as a function of at least the modified secret nonce, the third curve point, and a hash value generated by applying a hash function to at least the data of the message; and
generating a digital signature based on the signature component.

20. The non-transitory computer-readable medium of claim 19 wherein the generating the signature component includes performing a modular multiplication of an inverse of the modified secret nonce and of a hash value calculated by applying the hash function to the data of the message.

21. The non-transitory computer-readable medium of claim 19 wherein the generating the signature component includes adding the modified secret nonce and a hash value calculated by applying the hash function to the data of the message and to the third curve point.

\* \* \* \* \*